United States Patent [19]

Kashio

[11] 4,031,516

[45] June 21, 1977

[54] TRANSMISSION DATA PROCESSING DEVICE

[75] Inventor: Toshio Kashio, Tokyo, Japan

[73] Assignee: Casio Computer Co., Ltd., Tokyo, Japan

[22] Filed: June 4, 1975

[21] Appl. No.: 583,845

[30] Foreign Application Priority Data

June 7, 1974 Japan .............................. 49-63932

[52] U.S. Cl. ............................................ 364/200
[51] Int. Cl.² ........................................ G06F 13/00
[58] Field of Search .................... 340/172.5, 365 S; 178/17 C

[56] References Cited

UNITED STATES PATENTS

| | | | |
|---|---|---|---|
| 2,801,406 | 7/1957 | Lubkin | 340/365 S X |
| 3,208,046 | 9/1965 | Young | 340/172.5 |
| 3,210,734 | 10/1965 | Andrews et al. | 340/172.5 |
| 3,689,915 | 9/1972 | De Clerck et al. | 340/365 S X |

Primary Examiner—Raulfe B. Zache
Attorney, Agent, or Firm—Flynn & Frishauf

[57] ABSTRACT

A transmission data processing device has a memory for storing a series transmission data comprised of each work data with an $n$-bit word positioning code inserted therebetween and including $m$-bit letter, numeral and function data, the function and numerical data being capable of taking an $n$-bit configuration, the function data including together with the word positioning code a code for designating an $m$-bit configuration in which $n$ is smaller than $m$. When the $n$-bit word positioning code is read out of the series transmission data stored in the memory, each data in a group of characters constituting all or part of the word data is read out as an $n$-bit configuration and, when the $n$-bit function data for designating an $m$-bit configuration is read out, each data in a group of characters constituting all or part of the word data is switched from the $n$-bit to the $m$-bit configuration and transmitted as such until the next word positioning code is read out.

12 Claims, 3 Drawing Figures

TRANSMISSION DATA PROCESSING DEVICE

This invention relates to a transmission data processing device in which a group of characters constituting all or part of each word data in a series transmission data is selectively controlled in accordance with its content so as to be read out and transmitted as two kinds of bit configurations, each, corresponding to one character.

Generally, where word data is coded, the number of bits corresponding to one character differs dependent upon whether characters in the word data are, for example, letter, numeral or function data. The numeral data can be selected from among decimal numerals 0 to 9 and the function data will be sufficient if several kinds are selected. Consequently, the numeral and functional data can be taken as a 4-bit configuration. If the letter data is included in the transmission data, at least 128 kinds will be required due to a great increase in the kinds of letters and it is therefore necessary to increase the number of bits corresponding to one character. Where the word data includes letter, numeral and function data, even the numeral and function data which require only a smaller number of bits in its code representation had to be represented, as in the case of the letter data, as a greater number of bits. The reason for this is that, in the present art level, it is impossible to transmit characters of different kinds included in the word data, as a corresponding different number of bits.

Such a transmission data is used, as arithmetic operation data or various other data, in electronic computers. Generally, such transmission data inputted by input means is, first of all, stored in a memory of the computer and is in preparation for the subsequent totalizing operation under a predetermined program. The transmission data so stored in the memory is processed under a certain program at a processing means such as a printer. Such transmission data usually includes a large number of numerical data. If the numerical data is coded as a lesser number of bits, the number of bits transmitted through such a transmission data processing device can be prominently reduced with the consequent increased arithmetic operation speed. Furthermore, an increased data transmitting and processing capability can be expected since, for example, a memory capacity can be increased as compared with the conventional transmission data processing device.

SUMMARY OF THE INVENTION

This invention has been conceived in view of the above-mentioned situations and the object of this invention is therefore directed to a transmission data processing device in which a first memory is adapted to store a series transmission data comprised of each word data with an $n$-bit word positioning code inserted between and including $m$-bit letter, numeral and function data, said functional and numeral data being capable of taking an $n$-bit configuration with $n$ being smaller than $m$, said function data including together with said $n$-bit word positioning code a code for designating an $m$-bit configuration; and in which, when said $n$-bit function code is said code for designating an $m$-bit configuration, a group of characters constituting all or part of the word data is read out as an $m$-bit configuration until the next subsequent word positioning code is read out, and stored in a second memory for transmission to a printing device.

According to this invention, therefore, the numerical and/or function data immediately following the $n$-bit word positioning code is read out as an $n$-bit configuration and, when the $n$-bit function code for designating an $m$-bit configuration is read out, a group of characters constituting all or part of the word data is read out as an $m$-bit configuration until the next subsequent word positioning code is read out. In this way, the series transmission data is transmitted and processed, according to its content, as two kinds of coded data having a different number of bits. As a result, the number of bits transmitted through the transmission data processing device can be decreased, resulting in increased arithmetic operation speed and increased data transmitting and processing capability.

DETAILED DESCRIPTION

This invention pertains to a transmission data processing device for reading out of memory a series transmission data as two kinds of coded data having a different number of bits and transmitting the same. Explanation will be made, by reference to FIGS. 1 and 2, as to how such a series transmission data is generated and transmitted in the memory. It should be noted that this invention is not restricted to the data input section of FIG. 1. Any other data input device, if it is of a type in which a series transmission data is inputted into the memory as two kinds of coded data having a different number of bits, may be used without departing from the scope and spirit of this invention.

Figure 1:
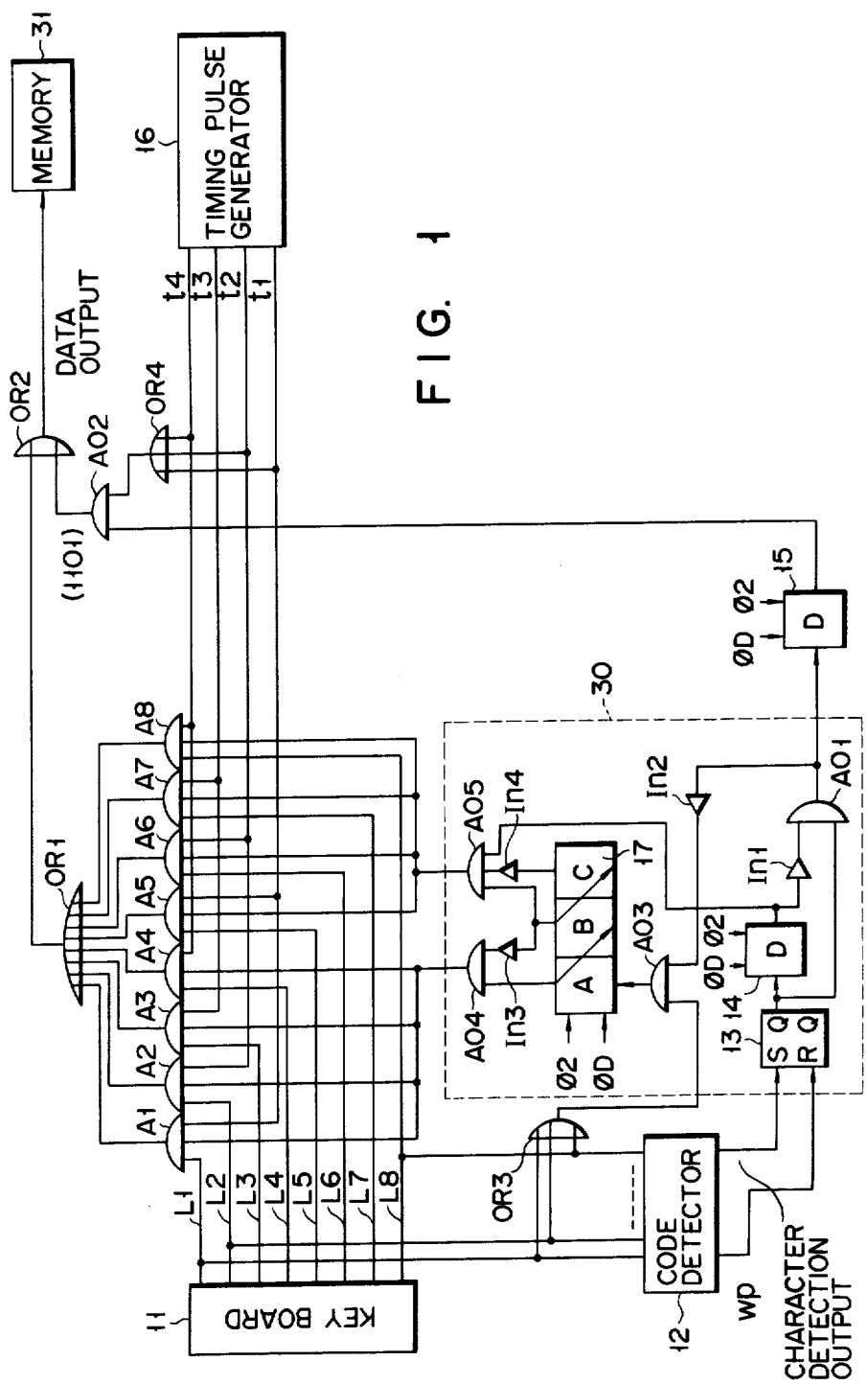
FIG. 1 is a block diagram showing one embodiment of a data input section used in this invention.
Figure 2:
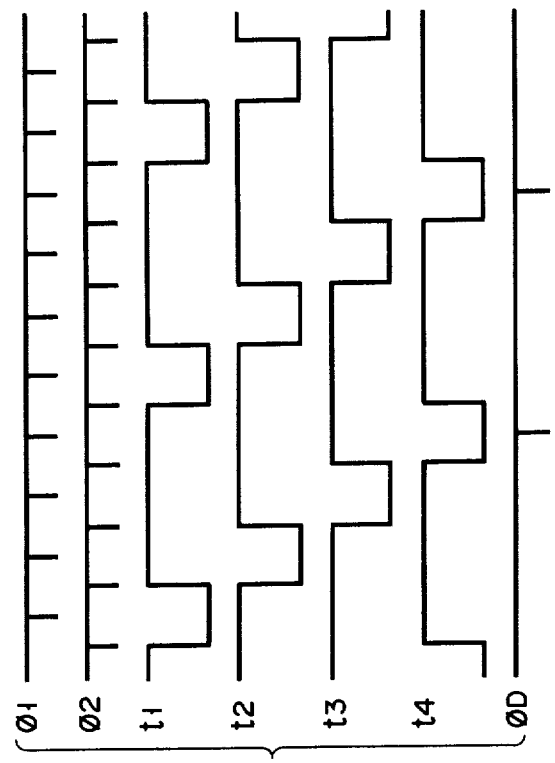
FIG. 2 is a timing chart explaining the function of the embodiment of FIG. 1.

In FIG. 1, a key board 11 has output lines $L_1$ to $L_4$ corresponding to a 4-bit configuration and output lines $L_1$ to $L_8$ corresponding to an 8-bit configuration. Outputs on the lines $L_1$ to $L_4$ as generated through key operation are coupled as a gate input to AND circuits $A_1$ to $A_4$, respectively. The AND circuits $A_1$ to $A_4$ generate outputs, respectively, upon receipt of the other outputs both from a timing pulse generator 16 and from a bit-number selection circuit 30 to be later described. The outputs of the AND circuits $A_1$ to $A_4$ are coupled through OR circuits $OR_1$ and $OR_2$, as a 4-bit configuration, to a memory to be later described. Likewise, outputs on the lines $L_1$ and $L_8$ are coupled as an 8-bit configuration to a memory 31 through AND circuits $A_1$ to $A_8$ and OR circuits $OR_1$ and $OR_2$. The memory 31 may be comprised of a drum, tape or disk constituting a magnetic memory device. It is to be noted that, if the $n$-bit configuration is such a 4-bit configuration, the $m$-bit configuration may be properly selected as, for example, a 7- or 9-bit configuration. In this case it is only necessary to select the number of output lines and of AND circuits accordingly. That is, it will be sufficient if $n < m$ is satisfied. In this embodiment, the transmission data as obtained through key operation is a 4-bit configuration in the case of numeral and functional data and an 8-bit configuration in the case of letter data. In the 4-bit configuration, a set of 16 coded data 0000 to 1111 is obtained. One or more specific codes are selected, as function data, from among the 16 data so obtained and the remaining maximum possible 15 data including coded data corresponding to decimal numerals 0 to 9 are selected as numerical data. By way of example, 11 coded data 0000 to 1010 corresponding to decimal numerals 0 to 9 and decimal point are employed as numerical data and the remaining 5 coded data 1011 to 1111 as specific code. Where an 8-bit configuration is used as letter data as opposed to numerical data of 4-bit configuration, $11 \times 11 = 121$ letter data to the exclusion of the above-mentioned 5 specific coded data can be obtained by combining together 8 bits corresponding to two numerical data. Data to be transmitted includes word data between which a word positioning code "$wp$" (hereinafter referred to as a code $wp$ ) is inserted as shown, for example, in the series transmission data "123$wp$456ABC12$wp$456 . . .". Note that the word positioning code "$wp$" may also function as a code for a space key, return instruction key — in the input section. Since the numerical and letter data are 4- and 8-bit configurations, respectively, letters A . . . in the word data ". . . 456ABC12 . . ." is transmitted, it is necessary to effect a switch from the 4-bit to the 8-bit configuration. The code $wp$ is selected from among the specific coded data 1011 to 1111 and, therefore, when letters A . . . in the word data ". . . $wp$ ABC . . ." is to be transmitted, it is also necessary to make a switch from the 4-bit configuration to the 8-bit configuration. To attain such code switching a specific code $\alpha$ for designating the 8-bit configuration is inserted immediately ahead of a head letter in a word data so that any data immediately following the code $\alpha$ can be read out as an 8-bit configuration until the next word positioning code is read out. In this embodiment the data 1011 of the above-mentioned 5 specific data 1011 to 1111 may be selected as a function code $\alpha$ (hereinafter referred to as a code $\alpha$) for designating the 8-bit configuration. Consequently, the above-mentioned series transmission data can be read out as ". . . 123$wp$456$\alpha$ABC12$wp\alpha$ABC$wp$456 . . .". This is, characters in each word data can be read out as two kinds of coded data having a different number of bits. The output lines $L_1$ to $L_8$ are connected to an OR circuit $OR_3$ where inputs as obtained through key operation are detected. The output lines $L_1$ to $_8$ are also connected to a code detector 12 where the presence of the code $wp$ and letter data as inputted through key operation are detected. The letter detection of the code detector 12 is effected by an output obtained by coupling output signals on the lines $L_5$ to $L_8$ to the OR circuit and the code $wp$ detection is effected by an output obtained by coupling output signals on the lines $L_3$ to $L_4$ to the AND circuit. Where the code detector 12 detects an input indicative of the presence of the letter data, it generates an output which is coupled to a flip-flop circuit 13 in the above-mentioned bit-number selection control circuit 30 to cause the latter to be set. Where, on the other hand, the code detector 12 detects the presence of the code $wp$, it generates an output which is coupled to the flip-flop circuit 13 to cause the latter to be reset. The bit-number selection control circuit 30, upon receipt of an output from the OR circuit $OR_3$ i.e. a key input from the keyboard 11, opens the gates of the AND circuits $A_1$ to $A_4$. If, at this time, the flip-flop 13 is set under the presence of the letter detection output, the bit-number selection control circuit 30 opens the gates of the AND circuits $A_5$ to $A_8$ through the AND circuit $AO_5$ after the gates of the AND circuits $A_1$ to $A_4$ are so opened. That is, the bit-number selection control circuit 30 is so controlled that a 4-bit data (numerical or function data) on the lines $L_1$ to $L_4$ or an 8-bit data (letter data) on the lines $L_1$ to $L_4$ and $L_5$ to $L_8$ can be selected upon receipt of timing pulses $t_4$ to $t_1$, corresponding to the respective bit positions, which are generated at a timing pulse generator 16. Where, for example, a first code $wp$ in the series transmission data is detected at the code detector 12 and OR circuit $OR_3$ having eight gates coupled to the output lines $L_1$ to $L_8$, the OR circuit $OR_3$ generates an output which is coupled as one gate input to an AND circuit $AO_3$. The other gate of the AND circuit $AO_3$ is coupled to an inverter $In_2$. Since the flip-flop 13 is reset by the detection output of the code detector 12, no output is generated from an AND circuit $AO_1$ coupled to the set terminal of the flip-flop circuit 13 and, in consequence, an output appears from an inverter $In_2$. The output of the inverter $In_2$ is coupled to the AND circuit $AO_3$ to cause the gate of the latter to be opened to permit the outputs of the OR circuit $OR_3$ to be inputted in a flip-flop A in a group of flip-flops 17. The group of flip-flops 17 consists of series-connected flip-flops A, B and C and is adopted to receive a clock pulse $\phi_D$ at an interval of 4 bits as shown in FIG. 2 and generate an output upon receipt of a clock pulse $\phi_2$. At the time when the output of the AND circuit $AO_3$ is inputted to the flip-flop A in the group of flip-flops 17 and an output appears from the flip-flop A, no output is generated from the flip-flop B and, in consequence, an output appears from an inverter $In_3$ coupled to the output terminal of the flip-flop B. The output of the inverter $In_3$ is coupled as one gate input to an AND circuit $AO_4$. Since the output of the flip-flop A is coupled to the AND circuit $AO_4$, the AND circuit $AO_4$ generates an output which is coupled as a gate input to the AND circuits $A_1$ to $A_4$. If, at this time, the AND circuits $A_1$ to $A_4$ receive the timing pulses $t_4$ to $t_1$, as shown in FIG. 2, from the timing pulse generator 16, the parallel code $wp$ data as inputted through key operation is generated as a 4-bit series code from the AND circuits $A_1$ to $A_4$ and transmitted through the OR circuits $OR_1$ and $OR_2$.

When, in this state, each character in the word data "123" in the above-mentioned series transmission data "123$wp$456ABC12$wp$ABC$wp$456 . . ." is inputted as a 4-bit configuration, these characters are detected, at the OR circuit $OR_3$, as being inputted through key operation and sequentially coupled through the AND circuit $AO_3$, group of flip-flops 17 and AND circuit $AO_4$ to the AND circuits $A_1$ to $A_4$. As a result, the parallel code data on the output lines $L_1$ to $L_4$ are transmitted as a series code data. Since the next subsequent word data "456ABC12" includes letters A . . . corresponding to an 8-bit configuration, when the letters A . . . immediately following the numeral 6 in the word data "456ABC12" are inputted through key operation, the detector 12 detects the presence of any output at least from the output lines $L_5$ to $L_8$. The output of the detector 12 constitutes a letter detection output. The letter detection output of the code detector 12 is supplied to the set terminal of the flip-flop circuit 13 to cause the latter to be set. The set output of the flip-flop circuit 13 is coupled as one gate input, and through a delay circuit 14 and inverter $In_1$ as the other gate, to the AND circuit $AO_1$. The AND circuit $AO_1$ generates an output during the 4-bit time delay as determined at the delay circuit 15 and the output of the AND circuit $AO_1$ inhibits an input into the AND circuit $AO_3$ through the inverter $In_2$ and momentarily blocks the conversion of the character A into a series code. The output of the AND circuit $AO_1$ is coupled as one gate input to an AND circuit $AO_2$ through a delay circuit 15. To the other gate input of the AND circuit $AO_2$ are coupled through OR circuit $OR_4$ the timing outputs $t_4$, $t_2$ and $t_1$, associated with the formation of the $\alpha$ code, which are generated from the timing generator 16. The output of the AND circuit $AO_2$ is transmitted, through the OR circuit $OR_2$, as a coded data 1011. When the $\alpha$ code is so transmitted, the gate of the AND circuit $AO_3$ is opened. The output of the AND circuit $AO_3$ is coupled to the flip-flop A to generate an output. The output of the flip-flop A causes data on the lines $L_1$ to $L_4$ . . . which, together with data on the lines $L_5$ to $L_8$, constitutes the letter A data . . . to be converted into a series code. The output of the delay circuit 14, together with the output of the flip-flop B, is coupled as gate inputs to an AND circuit $AO_5$. The output of the flip-flop C in the group of flip-flops 17 is also coupled through an inverter $In_4$ to the AND circuit $AO_5$. Consequently, subsequent to the appearance of an output from the AND circuit $AO_4$ outputs appear from the AND circuit $AO_5$.

Figure 3:
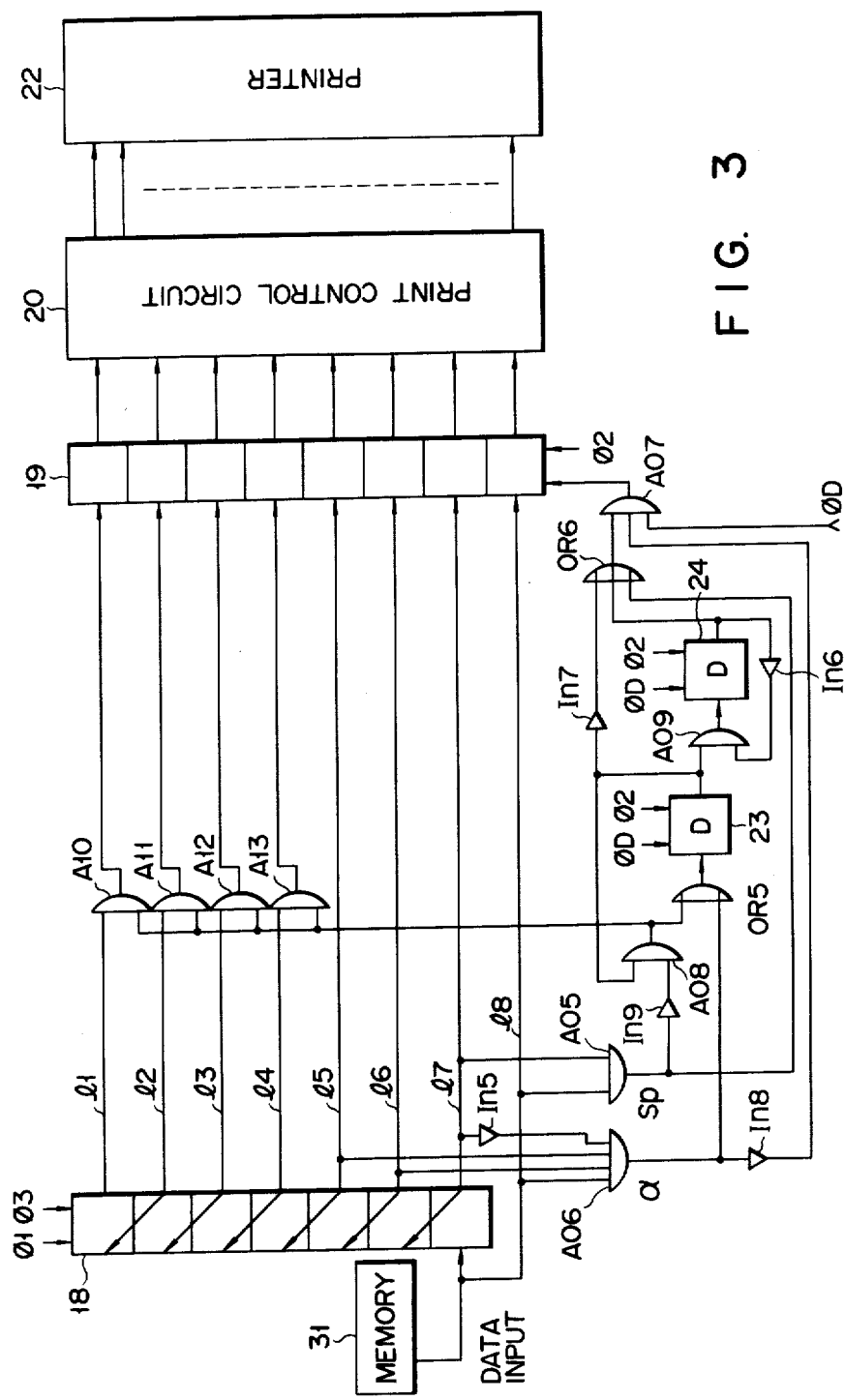
FIG. 3 is a block diagram showing one embodiment according to this invention.

The output of the AND circuit $AO_5$ is coupled as a gate input to the AND circuits $A_5$ to $A_8$. Since, at this time, signals corresponding to the letters A . . . as inputted through key operation on the keyboard 11, as well as the timing pulses $t_4$ to $t_1$ of the timing pulse generator 16, are supplied to the AND circuits $A_1$ to $A_8$, the AND circuits $A_5$ to $A_8$ generate outputs subsequent to the generation of outputs from the AND circuits $A_1$ to $A_4$. The outputs of the AND circuits $A_1$ to $A_8$ are transmitted through the OR circuits $OR_1$ and $OR_2$. After the head letter A in the word data "456ABC12" is so transmitted as an 8-bit configuration, the immediately following characters BC12 . . . in the word data are read out as an 8-bit configuration until the flip-flop 13 is reset by the letter data detection output of the detector 12. In other words, when the head letter in the word data is so inputted through key operation on the keyboard 11, the specific code $\alpha$ is read out from OR circuit $OR_2$ as a 4-bit configuration so as to designate an 8-bit configuration and then characters immediately following the head letter in the word data are read out as an 8-bit configuration until the word positioning code $wp$ is read out. It is therefore possible to transmit such a series transmission data as two kinds of coded data having a different number of bits. The so formed transmission data is stored in the memory 31 and properly processed. Apart from the above, two outputs from the bit-number selection control circuit 30, or more precisely the two outputs from the AND circuits AO 4 and AO 5 as shown in FIG. 1, can be regarded each as an output obtained each time a counter makes one count. Thus, if a group of flip-flops 17 are considered to form the main part of such a counter, the outputs from the AND circuits AO 4 and AO 5 can be considered to form the outputs of the counter, the two outputs from AND circuits AO 4 and AO 5 being the same as corresponding outputs produced by such a counter. When the so stored transmission data is transmitted, it is inputted to the first buffer memory 18 in FIG. 3 where it is stored. FIG. 3 shows a block diagram showing how the so stored data is read out for transmission to a printer 22. The memory 18 is a register consisting of for example, seven flip-flops adapted to effect write in and readout controls by the clock pulses $\phi_1$ and $\phi_2$, respectively. Data readout lines $l_8$ and $l_7$ to $l_1$ are connected to the output terminal of the input data section and the bit positions of the memory 18, respectively. The data readout lines $l_8$ to $l_5$ are connected to corresponding flip-flops in a second buffer memory 19 so that an output is generated, as a 4-bit configuration, from the second memory 19. The outputs on the data readout lines $l_4$ to $l_1$ are connected respectively through AND circuits $A_{13}$ to $A_{10}$ to corresponding flip-flops in the second buffer memory 19 so that outputs including said outputs on the lines $l_4$ to $l_1$ are generated, as an 8-bit configuration, from the second buffer memory 19.

Suppose that the above-mentioned series transmission data "123wp456αABC12wpABCwp456" is inputted into the first buffer memory 18. In this case, a code $wp$ is first detected, through the data readout lines $l_8$ to $l_7$, as an AND circuit $AO_5$. The output of the AND circuit $AO_5$ is coupled as one gate input to an AND circuit $AO_7$ through an OR circuit $OR_6$. As already mentioned above, the word positioning code $wp$ is selected from among 1100 1101, 1110 and 1111 and when the weighted bits 11 corresponding to the timing pulses $t_4$ and $t_3$ are read out, an output generates from the AND circuit $AO_5$. The output of the AND circuit $AO_5$ functions as a code $wp$ when it is at the $\phi_D$ timing. On the other hand, a code $\alpha$ is detected, through the data readout lines $l_8$ to $l_5$, at an AND circuit $AO_6$. Since the data readout line $l_7$ is coupled through an inverter $In_5$ to the AND circuit $AO_6$, the AND circuit $AO_6$ detects a code $\alpha$ output 1011 at the $\phi_D$ timing which is coupled as one gate input to the AND circuit $AO_7$ through an inverter $In_8$. At the time when the code $wp$ is detected at the AND circuit $AO_5$, no code $\alpha$ is detected and the inverter $In_8$ generates an output which is coupled as a gate input to the AND circuit $AO_7$. At this time, the output of an inverter $In_7$ is coupled as a gate input to the AND circuit $AO_7$ through the OR circuit $OR_6$. When the clock pulse $\phi_D$ as shown in FIG. 2 is inputted as a gate input into the AND circuit $AO_7$, the AND circuit $AO_7$ generates an output which is supplied as a writein instruction clock pulse to the second buffer memory 19. As a result, numerals 123 following the code $wp$ data are sequentially transmitted, as a 4-bit configuration, through the data readout lines $l_8$ to $l_5$, to the second buffer memory 19 where it is stored. Numerals in the next word data "456" immediately following the code $wp$ data are likewise read out as a 4-bit configuration and transmitted as such. When a head letter A in the next subsequent word data "ABC12" is to be read out, the code $\alpha$ is detected at the AND circuit $AO_6$. The output of the AND circuit $AO_6$ is supplied through an OR circuit $OR_5$, delay circuit 23 and AND circuit $AO_8$ to the other gate of the AND circuits $A_{13}$ to $A_{10}$ coupled to the data readout lines $l_4$ to $l_1$, respectively. Since, at this time, no code $wp$ output appears from the AND circuit $AO_5$, an inverter $In_9$ generates an output which is coupled to the AND circuit $AO_8$. The output of the AND circuit $AO_8$ is supplied through the OR circuit $OR_5$ to the delay circuit 23 each time the latter receives the digit pulse $\phi_D$. The output of the delay circuit 23 continues to be supplied as the other gate input to the AND circuit $AO_8$ until the code $wp$ data is read out, and the output of the inverter $In_7$ ceases to exist. After the code $\alpha$ data is detected at the AND circuit $AO_6$ and an output appears from the delay circuit 23, the gates of the AND circuits $A_{13}$ to $A_{10}$ are opened and letters "ABC" and numerals 12 in the word data can be transmitted as an 8-bit configuration, through the AND circuits $A_{13}$ to $A_{10}$. The output of the delay circuit 23 is delivered through an AND circuit $AO_9$, delay circuit 24 and OR circuit $OR_6$ to the AND circuit $AO_7$. The output of the delay circuit 24 is applied through an inverter $In_6$ to the other gate of the AND circuit $AO_9$ with the result that a binary operation is effected at a 4-bit interval. When the code $\alpha$ is detected at the AND circuit $AO_6$ as already mentioned, no output appears from the inverter $In_8$ and, in consequence, the written instruction from the AND circuit $AO_7$ to the second buffer memory 19 is interrupted and the 4-bit data read out of the first buffer memory 18 is interrupted. Upon passage of an 8-bit delay time after the $\alpha$ code detection i.e. at the timing in which the letter A is read out, the clock pulse $\phi_D$ is also coupled to the AND circuit $AO_7$. The output of the AND circuit $AO_7$ is applied as a writein instruction clock pulse to the second buffer memory 19. As a result, characters in the word data "ABC12" are transmitted, as an 8-bit configuration, through lines $l_8$ to $l_5$ and AND circuits $A_{13}$ to $A_{10}$ on the lines $l_4$ to $l_1$, to the second buffer memory 19 where they are stored. The data so stored in the second buffer memory 19 is read out upon receipt of the readout clock pulse $\phi_2$ and after controlled at a print control circuit 20 including a decoder, printed at the printer 21. As already mentioned above, individual data in the series transmission data are read out, transmitted and stored as two kinds of coded data having a different number of bits and in consequence the capacity of the memory can be made small compared with that of the conventional one.

Although with the above-mentioned embodiment the specific code $\alpha$ for designating an 8-bit configuration is inserted immediately before letter data corresponding to an 8-bit configuration and used independently of the word positioning code $wp$, if any letter, numeral and function data are together included in any word data of such a transmission data they can be treated as an 8-bit configuration, in this case, any two codes can be selected from among the above-mentioned five specific codes 1011 to 1111 and either one of the so selected positioning codes can be used as a code for designating an 8-bit configuration.

The above-mentioned series transmission data may include, in addition to numerals, a decimal point and symbols + − × ÷ etc. as frequently employed in an arithmetical operation, which can also be expressed as a 4-bit configuration. In this case, the corresponding specific code may be selected from among the above-mentioned five specific codes including the coded data 1011 to 1111 and the remaining codes may be used as said series transmission data.

What is claimed is:

1. A transmission data processing device for serially transmitting records each constituted by data word of variable length which have word positioning codes ($wp$) interposed among them and each of which includes a spontaneous number of binary-coded characters, said device comprising:

a memory means (31) for storing as a series transmission data a record comprised of predominantly numeric data characters coded in $n$ bits, of data characters including at least one character and coded in $m$ bits and of specific function codes ($\alpha$) of $n$ bits and inserted immediately before at least said data characters and contained in each data word, where $n$ is smaller than $m$;

means (AO 6) coupled to said memory means (31) for detecting said function codes ($\alpha$) read out from said memory means (31);

bit configuration designating means (OR 5, delay 23 AND AO 8) having an input coupled to said detecting means (AO 6) for reading in $m$-bit configuration the data characters from said memory means (31) after said detection means produces a detection output; and means (AO 5, In 9) coupled to said memory means (31) and to said designating means (OR 5, delay 23, AND AO 8) for releasing the $m$-bit configuration designating mode of said designating means upon detection of an $n$ bit word positioning code.

2. A transmission data processing device according to claim 1 in which said memory means comprises a magnetic memory device.

3. A transmission data processing device according to claim 1 in which said detecting means detects a function code which includes a word positioning code for designating an $n$-bit configuration and a specific code for designating an $m$-bit configuration.

4. A transmission data processing device according to claim 1 in which the bit configuration of each data character of the $m$-bit data characters said record does not include any bit configuration from which the $n$-bit code is designated.

5. A transmission data processing device according to claim 1 in which said word positioning codes ($wp$) are of two types, each word positioning code ($wp$) of one type being a function code ($\alpha$) in the form of a single character when it is followed by an $m$ bit data character.

6. A transmission data processing device according to claim 1, further including means for inputting the series transmission data into said memory means.

7. A transmission data processing device according to claim 6 in which said input means comprises:

means (11) for inputting in parallel binary signals constituting coded data;

means (12) for detecting a word positioning code and an $m$-bit data character in response to an output from said binary signal input means (11);

means (30) for designating according to a detection output from said detection means (12) whether any data should be read out from said binary signal input means (11) in $n$-bit configuration or in $m$-bit configuration;

means (16) for determining the timing with which a data is to be read out from said binary signal input means (11) in the designated bit configuration; and logic circuit means ($A_1$ to $A_8$, $OR_1$, $OR_2$) coupled to said readout timing determining means (16), input means (11) and to said bit configuration designating means (30) and adapted to store into a memory device coded data from said binary signal input means (11) in the form of serial coded data.

8. A transmission data processing device according to claim 7 in which said bit configuration designating means comprises a logic circuit including a counter for supplying to said first group of logic circuits, upon receipt of a word positioning code detection output from said detecting means (12), an output for designating an $n$-bit data item.

9. A transmission data processing device according to claim 7 in which said bit configuration designating means comprises a logic circuit including a counter adapted to supply to said second group of logic circuits, upon receipt of an $m$-bit data character detection output from said detecting means (12), an output for designating an $m$-bit data item.

10. A transmission data processing device according to claim 7 in which said logic circuit means comprises a first group of logic circuits for reading out the $n$-bit configuration data from said data input means in response to the timing output from said data readout timing determining means; and a second group of logic circuit groups, including said first group of logic circuits, for reading out the $m$-bit configuration data.

11. A transmission data processing device according to claim 10 in which said first group of logic circuits comprises $n$ number of AND circuits and is adapted to receive as gate inputs a coded data from said data input, a timing output from said timing determining means and a control output from said bit configuration designating means.

12. A transmission data processing device according to claim 10 in which said second group of logic circuits includes said first group of logic circuits and comprises $m$ number of AND circuits adapted to receive as a gate input a coded data from said data input means, a timing output from said timing determining means and a control output from said bit configuration designating means.

* * * * *